United States Patent
Naskar et al.

[15] 3,705,186
[45] Dec. 5, 1972

[54] PROCESS FOR THE PREPARATION OF DIPHENYL TEREPHTHALATE

[72] Inventors: Sasanka Sekhar Naskar, Witten-Ruhr; Hans-Leo Hulsmann, Wengern; Gustav Renckhoff, Witten-Ruhr, all of Germany

[73] Assignee: Chemische Werke Witten GmbH, Witten/Ruhr, Germany

[22] Filed: Jan. 16, 1969

[21] Appl. No.: 791,767

[30] Foreign Application Priority Data

Jan. 31, 1968 Germany..........P 16 68 894.9

[52] U.S. Cl............................................260/475 PN
[51] Int. Cl..............................................C07c 69/82
[58] Field of Search................................260/475 PN

[56] References Cited

UNITED STATES PATENTS 3,413,336  11/1968  Hulsmann et al....260/475 PN
3,471,549  10/1969  Hulsmann et al....260/475 PN Primary Examiner—Lorraine A. Weinberger
Assistant Examiner—E. Jane Skelly
Attorney—Craig, Antonelli and Hill

[57] ABSTRACT

A process for the preparation of pure, colorless diphenyl terephthalate which comprises heating a dialkyl terephthalate with phenyl acetate in the presence of activated carbon to temperatures above 150°C. in an inert atmosphere, then adding a transesterification catalyst, such as a titanic acid ester, thereto, removing the alkyl acetate formed in the reaction and introducing the hot carbon-containing crude ester into a relatively high boiling aromatic hydrocarbon, such as xylene, also in an inert atmosphere, and crystallizing the product after removing the activated carbon through filtration. Optionally, fresh adsorbent may be added along with the aromatic hydrocarbon prior to crystallization.

18 Claims, No Drawings

PROCESS FOR THE PREPARATION OF DIPHENYL TEREPHTHALATE

BACKGROUND OF THE INVENTION

This invention relates to the preparation of pure, colorless diphenyl terephthalate. More particularly, it relates to a process for the preparation of pure diphenyl terephthalate utilizing a special procedure wherein charcoal or activated carbon is employed as an adsorbent. Even more particularly, the invention relates to a procedure for carrying out a transesterification process for obtaining diphenyl terephthalate, overcoming the disadvantages inherent in using titanic acid ester catalysts.

In accordance with U.S. Pat. No. 3,413,336, uniform diaryl esters of aromatic dicarboxylic acids, the carboxyl groups of which are not in adjacent positions, can be produced by heating the acids or the alkyl esters thereof having one to six carbon atoms in the alkyl ester groups thereof with equivalent amounts or a slight excess of a phenol and of an acetic acid anhydride to temperatures above 140°C. in the presence of transesterification catalysts, and removing the thus-liberated acetic acid and, in the appropriate case the alkyl acetate, from the reaction mixture as quickly as possible. Since titanic acid esters are far superior in effectiveness to all other catalysts in the case of terephthalic acid, they are used in the preparation of the aryl esters of terephthalic acid. However, the crude diphenyl terephthalate obtained in the presence of titanium compounds exhibits a deep red color. This coloration cannot be completely removed by recrystallizing the ester from solvents, such as aromatic hydrocarbons, or with the use of adsorbents, such as activated carbon or charcoal or activated fuller's earth even when conducting this recrystallization step several times. Since it is absolutely necessary for many applications of diphenyl terephthalate, for example, in the production of polycondensation products, that the diphenyl terephthalate be colorless, it has been necessary heretofore to employ a vacuum distillation in such processes. However, such a step involves special difficulties, because of the very high melting point of the diphenyl terephthalate of 199°–200° C. Accordingly, steps such as these can be conducted only in a very expensive and complicated manner.

Accordingly, one of the objects of the present invention is to provide an improved process for the production of diphenyl terephthalate which overcomes the disadvantages and deficiencies of the prior art methods.

Another object of the invention is to provide a process for the preparation of diphenyl terephthalate which may be carried out in an efficacious manner.

A further object of the invention is to provide a process for producing diphenyl terephthalate which may be carried out advantageously on an industrial scale at low cost to give a high yield of product.

A still further object of the invention is to provide pure, colorless diphenyl terephthalate.

These and other objects and advantages of the present invention will become apparent to those skilled in the art from a consideration of the following specification and claims.

SUMMARY OF THE INVENTION

In accordance with the present invention, it has been discovered that pure, colorless diphenyl terephthalate can be produced by the transesterification of dialkyl terephthalates with at least equivalent amounts of phenyl acetate in the presence of butyl titanate as the catalyst, as described in U.S. Pat. No. 3,413,336, by utilizing the following procedure, i.e., (a) heating the dialkyl terephthalate with phenyl acetate in an inert atmosphere with the addition of 1–5 percent weight of activated carbon to temperatures above 150°C., (b) only then adding the titanic acid ester, (c) removing the alkyl acetate which is split off from the reaction mixture as soon as possible, (d) introducing, with stirring after the reaction is terminated, the hot carbon-containing crude ester into a relatively high boiling aromatic hydrocarbon, such as xylene, ethyl benzene, diethyl benzene, and the like, under an inert gas, optionally adding fresh adsorbent along with the hydrocarbons used, and (e) crystallizing the product after removing activated carbon through filtration.

The starting materials to be employed and the reaction conditions in general are disclosed in said U.S. Pat. No. 3,413,336. Suitable as starting materials are the alkyl esters of terephthalic acid having one to six carbon atoms in the alkyl ester groups thereof. At least one mole of phenyl acetate is employed for each carboalkoxy group to be reacted. It can be advantageous to use a small excess of phenyl acetate in order to obtain a quantitative conversion. However, in general, an excess of 25 percent beyond the equivalent amounts should not be exceeded because of reasons of economics.

Ortho-titanic acid esters, for example, tetrabutyl titanate or tetraphenyl titanate, are preferably used as the catalytically active titanium compounds in accordance with this invention. They are normally used in amounts of from about 0.1 to 5.0 percent by weight, relative to the amount of aromatic dicarboxylic ester employed.

The dialkyl terephthalate and an at least equivalent amount of phenyl acetate are heated to approximately 150° C., after the addition of 1–5 percent by weight of activated carbon in an inert atmosphere, and the reaction mixture is maintained at this temperature for a few minutes under agitation in order to remove the air. Suitable inert gases for providing the inert atmosphere include those conventionally used, such as nitrogen, carbon dioxide or mixtures thereof. Thereafter, the catalytically effective titanium compound is added to the mixture in an amount of from about 0.1 to 5.0 percent by weight, and the temperature in the reaction mixture is elevated to such an extent that the cleavage of alkyl acetate commences and progresses vigorously. The temperature increases during the course of the transesterification process. Since the diphenyl terephthalate is very stable thermally, an upper temperature limit is of no importance. Toward the end of the transesterification, it can be advantageous to apply a vacuum in order to quickly remove the last quantities of alkyl acetate and to avoid an excessive overheating of the reaction charge.

After the reaction is terminated, any excess of phenyl acetate that was employed is removed by distilling off this compound. The hot reaction product, the ester proportion of which consists of diphenyl terephthalate in an approximately quantitative amount, is stirred, under an inert gas, into a relatively high boiling aromatic hydrocarbon, such as xylene, at about its boiling temperature. The temperature and amount of the aromatic hydrocarbon is regulated so that the diphenyl terephthalate remains in solution during filtration, leaving only activated carbon as the filtration residue. After filtering and cooling the filtrate to about room temperature, colorless diphenyl terephthalate crystallize out. In this connection, it can be advantageous to employ a fresh adsorbent, e.g., activated carbon, in the hydrocarbon used before stirring the hot reaction mixture therein. The colorless crystallized product is separated by vacuum-filtering or centrifuging from the mother liquor, washed with the pure solvent and dried.

EXAMPLE OF THE INVENTION

The following example is given merely as illustrative of the present invention and is not to be considered as limiting. Unless otherwise noted, the percentages therein and throughout the application are by weight.

EXAMPLE 194 parts by weight of dimethyl terephthalate (1 mole) and 326 parts by weight of phenyl acetate (2.4 moles) are molten in a flask equipped with a stirrer, a thermometer, a gas feed pipe and a column, after the addition of 5.2 parts by weight of activated charcoal under an inert gas. The reaction mixture is heated under agitation for 10 minutes to 150°C. while a stream of an inert gas is conducted through the apparatus. Thereupon, 1.3 parts by weight of butyl titanate is added thereto at 160° C. Within 80 minutes, the stoichiometric amount of methyl acetate has been split off. The hot carbon-containing reaction product is stirred, under an inert gas, into 1 liter of xylene containing 5.2 parts by weight of fresh activated carbon. The temperature of the solvent is maintained so that diphenyl terephthalate remains in solution. After filtering and cooling the filtrate to room temperature, the crystallized product is vacuum-filtered.

The dried crystallized product melts at 199°–200° C. It exhibits a saponification number of 353 (calculated: 353) and is completely colorless. The filtrate has a Hazen color number of 60.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for the preparation of pure, colorless diphenyl terephthalate which comprises heating a dialkyl terephthalate having one to six carbon atoms in the alkyl ester groups thereof with at least an equivalent amount of phenyl acetate in the presence of about 1 to 5 percent by weight of activated carbon in an inert atmosphere to a temperature above approximately 150°C., then adding a titanic acid ester catalyst thereto, introducing the carbon-containing crude ester, after the cleavage of alkyl acetate is terminated, under an inert gas into an aromatic hydrocarbon solvent for the diphenyl terephthalate, removing the activated carbon by filtration and crystallizing the thus separated product.

2. A process according to claim 1, wherein said catalyst is an ortho-titanic acid ester.

3. A process according to claim 1, wherein said catalyst is selected from the group consisting of tetrabutyl titanate and tetraphenyl titanate.

4. A process according to claim 1, wherein the amount of titanium catalyst employed is about 0.1 to 5.0 percent by weight.

5. A process according to claim 1, wherein the alkyl acetate split off during the course of the transesterification reaction is removed by means of a vacuum.

6. A process according to claim 1, wherein any excess of phenyl acetate left after the transesterification reaction has been completed is removed by distillation.

7. A process according to claim 1, wherein said aromatic hydrocarbon is selected from the group consisting of xylene, ethylbenzene and diethylbenzene.

8. A process according to claim 1, wherein said aromatic hydrocarbon is xylene.

9. A process according to claim 1, wherein said carbon-containing crude ester is introduced into said aromatic hydrocarbon while said aromatic hydrocarbon is maintained at about its boiling point.

10. A process according to claim 1, wherein fresh activated carbon is employed along with said aromatic hydrocarbon.

11. A process according to claim 1, wherein said carbon-containing crude ester is introduced into said aromatic hydrocarbon by means of stirring in an inert atmosphere.

12. A process for the preparation of pure, colorless diphenyl terephthalate which comprises heating a dialkyl terephthalate having one to six carbon atoms in the alkyl ester groups thereof with at least an equivalent amount of phenyl acetate in the presence of about 1 to 5 percent by weight of activated carbon in an inert atmosphere to a temperature above approximately 150°C., then adding about 0.1 to 5.0 percent by weight of a titanic acid ester catalyst thereto, introducing the carbon-containing crude ester, after the cleavage of alkyl acetate is terminated, under an inert gas into xylene, and again crystallizing the thus-separated carbon-containing crystallized product.

13. A process for the preparation of pure, colorless diphenyl terephthalate which comprises heating a dialkyl terephthalate having one to six carbon atoms in the alkyl ester groups thereof with at least an equivalent amount of phenyl acetate in the presence of about 1 to 5 percent by weight of activated carbon in an inert atmosphere to a temperature above approximately 150°C., then adding about 0.1 to 5.0 percent by weight of a titanic acid ester catalyst thereto, introducing the carbon-containing crude ester, after the cleavage of alkyl acetate is terminated, under an inert gas into xylene containing fresh activated carbon, and crystallizing the product after filtering off the activated carbon.

14. A process according to claim 13, wherein said catalyst is selected from the group consisting of tetrabutyl titanate and tetraphenyl titanate.

15. A process according to claim 14, wherein the alkyl acetate split off during the course of the transesterification reaction is removed by means of a vacuum.

16. A process according to claim 14, wherein any excess of phenyl acetate left after the transesterification reaction has been completed is removed by distillation.

17. A process according to claim 13, wherein said inert gas is selected from the group consisting of nitrogen and carbon dioxide.

18. A process according to claim 13, wherein up to about a 25 percent excess of phenyl acetate is employed.

* * * * *